(12) United States Patent
Lauper

(10) Patent No.: US 7,684,823 B2
(45) Date of Patent: Mar. 23, 2010

(54) CELLULAR MOBILE RADIO NETWORK AND METHOD FOR SETTING UP A BASE STATION OF A CELLULAR MOBILE RADIO NETWORK

(75) Inventor: Eric Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 1065 days.

(21) Appl. No.: 11/290,459

(22) Filed: Dec. 1, 2005

(65) Prior Publication Data

US 2006/0142066 A1    Jun. 29, 2006

(30) Foreign Application Priority Data

Dec. 2, 2004   (EP) .................................. 04106252

(51) Int. Cl.
*H04M 1/00* (2006.01)
(52) U.S. Cl. .............. 455/554.2; 455/554.1; 455/553.1; 455/560
(58) Field of Classification Search .............. 455/554.2, 455/554.1, 553.1
See application file for complete search history.

(56) References Cited

U.S. PATENT DOCUMENTS 4,748,655 A * 5/1988 Thrower et al. ............. 455/461
4,777,652 A   10/1988 Stolarczyk
5,832,364 A * 11/1998 Gustafson ..................... 455/14
6,151,480 A * 11/2000 Fischer et al. ........... 340/310.12
6,311,056 B1 * 10/2001 Sandidge .................. 455/414.1
7,242,959 B2 *  7/2007 Furukawa .................... 455/525
7,301,440 B2 * 11/2007 Mollenkopf ........... 340/310.11
2002/0083428 A1 * 6/2002 Lee ............................. 717/170

FOREIGN PATENT DOCUMENTS

GB     2 126 845 A   3/1984
WO    WO 99/00906   1/1999

* cited by examiner

*Primary Examiner*—Matthew D Anderson
*Assistant Examiner*—Adel Youssef
(74) *Attorney, Agent, or Firm*—Oblon, Spivak, McClelland, Maier & Neustadt, L.L.P.

(57) ABSTRACT

A cellular mobile radio network having at least one base station integrated into a facility supplied via a power supply network and being connected to an assigned base station controller. The at least one base station includes a module for exchanging radio frequency signals with mobile radio devices; a first transceiver module configured to couple the at least one base station to the power supply network; and a control device configured to control the facility. The control device is connected to the facility via the power supply network or directly, and includes an identification module and a module for communicating with a central unit, the control device being identifiable by the central unit based on the identification module.

18 Claims, 8 Drawing Sheets

CELLULAR MOBILE RADIO NETWORK AND METHOD FOR SETTING UP A BASE STATION OF A CELLULAR MOBILE RADIO NETWORK

CROSS-REFERENCE TO RELATED APPLICATIONS

This application is based on and claims priority to European Patent Application No. 04106252.2, filed Dec. 2, 2004, the entire contents of which are incorporated herein by reference.

BACKGROUND OF THE INVENTION

1. Field of the Invention

The present invention relates to a cellular mobile radio network and a method for setting up a base station of a cellular mobile radio network having at least one base station, integrated in each case into a facility supplied with power via a power supply system and connected to an assigned base station controller. The at least one base station is coupled to the power supply network via first transceiver module. A second transceiver module is likewise coupled to the power supply network at another place. The transmission of electrical signals corresponding to the radio frequency signals is made possible bidirectionally between the first and second transceiver modules over the power supply network, and the second transceiver module is connected to the base station controller assigned to the at least one base station, so that a communication over the power supply network is made possible between the at least one base station and the base station controller assigned thereto. In particular the invention relates to a cellular GSM and/or UMTS mobile radio network.

2. Discussion of the Background

Modern life is hardly conceivable anymore today without data and voice communication by means of mobile radio networks. Public mobile radio networks (PLMN: Public Land Mobile Network) make it possible for users to access diverse mobile telecommunications services. Such a mobile radio network can be viewed as an extension of the public fixed network (PSTN: Public Switched Telephone Network). It is typically composed of different transmitting and receiving areas, as is described e.g. in "Digital Cellular Telecommunications System; Network Architecture: GSM (Global System for Mobile communications); Technical Specification"; European Telecommunications Standards Institute (ETSI), TS/SMG-030302Q, the entire contents of which is incorporated by reference herein. The areas are assigned to a so-called Mobile-services Switching Center (MSC), the areas having a destination code and a common routing plan. An MSC forms the functional interface between the fixed network and the mobile radio network. The MSCs provide all the necessary functions for calls to or from a mobile radio device. To obtain area coverage for the receiving and transmitting area in a particular geographic region, a multiplicity of base station systems (BSS: Base Station System) are normally necessary, i.e., each MSC is thus an interface to a multiplicity of base station systems. Moreover, a multiplicity of MSCs are usually needed to cover an entire country. A BSS is made up of a Base Station Controller (BSC) and one or more base stations (BTS: Base Transceiver Station). A base station covers a so-called receiving/transmitting cell. The base station system includes all technically necessary means (transceivers, controllers, etc.), so that the MSC is able to communicate with a particular mobile radio device in a particular cell. A BSC is a network component of the mobile radio network for activating one or more base stations.

Mobile telecommunication over such above-described public mobile radio networks has been able to show tremendous growth in all sectors in the last few years through a wide range of new and improved products both in the technological area as well as in services. That a user of such a mobile radio network would be reachable at all times and everywhere is one of the factors which have contributed to this growth. Despite great efforts, however, this aim of the industry has not been achieved everywhere owing to the high costs for installation of an area-wide network of antennas with base stations, among other things. In contrast, in centers of population concentration it is nevertheless to be observed that because of competing telecommunications companies multiple coverage of the same area can often result. An unnecessarily high exposure (electrosmog) of the population thereby results in these areas in the radio frequency range. Peak exposures in such areas can be lowered in particular by structurally related shielding being reduced or circumvented through receiving and transmitting stations of a more local nature. The search for new, cost-viable solutions with as low as possible—but still sufficient—receiving and transmitting power in this field seems more important than ever today.

The UK patent application GB 2126845 A (U.S. Pat. No. 4,777,652) discloses a method and a system for extension of mobile radio networks in closed spaces such as e.g. mines. In the system, the carrier signal is coupled or respectively modulated to existing power supply cables which supply the mine with power. Inside the mine, the signal is demodulated by a transmitting station, and is broadcast in the mine by means of a repeater. The international patent application WO 99/00906 (U.S. Pat. No. 6,151,480) shows a method and a system for transmitting radio frequency signals over a power supply network. For this purpose the frequency of the signals at a first station are converted to a second frequency, and modulated to the power supply network. A second station demodulates the signals of the power supply network, and broadcasts them in their original frequency. Finally, the U.S. patent document U.S. Pat. No. 5,832,364 discloses a system for transmitting radio frequency signals over a power supply network. As in the previously mentioned patent document, a transceiver modulates the radio frequency signals to the power supply network. A second transceiver demodulates the signals, and broadcasts them with the original frequency.

The international patent application WO 02/09462 shows a method for setting up a base station of a mobile radio network. The base stations 20/21 in FIG. 2 are thereby installed in existing facilities on exposed public ground, which facilities are supplied with power via a power supply network 21. The signal transmission of the radio frequency signals takes place bidirectionally between the base station and the base station controller over the power supply network. The drawback of this state of the art, however, is that such facilities, in particular street illumination devices, are normally activated in a time-limited way. For example, for economic (energy-saving) or environmental reasons, street illumination devices 11 as shown in FIG. 1 are often switched on only at night or when poor visibility (dusk, fog) exists, by a control module 14. Therefore, if these public facilities are not operated in an ongoing manner, no mobile radio networks can be operated during the non-activated time using such base stations of the state of the art.

In the German unexamined patent publication DE 44 21 307 (WO 95/35618), a remote control system for electrical devices is described, a radio transmitter/receiver with a remote control interface and a remote control device allocated to the electrical device being provided. By means of a control device installed on the radio transmitter, remote control commands are generated and are transmitted to the remote control device. The remote control configuration relates in particular to a DECT wireless telephone (DECT: Digital European Cordless Telecommunication) and a base station. Remote control electrical devices include, for example, consumer devices in the home or garden. It is foreseen the transmission of remote control commands to the remote control device over a participant distribution facility by means of DTMF sequences (DTMF: Dual Tone Multi Frequency), as with the remote control inquiry of a telephone answering machine.

SUMMARY OF THE INVENTION

According to one aspect of the present invention, it is proposed a mobile radio network and a new corresponding method for setting up a base station of such a mobile radio network and connection of the base station to such a mobile radio network, which do not have the above-mentioned drawbacks. In particular it should be a solution which makes it possible for transmitting and receiving areas to be expanded quickly and economically, and this while taking into account economic aspects relating to energy use.

This aspect is achieved according to the present invention through the elements of the independent claims. Further advantageous embodiments follow moreover from the dependent claims and from the specification.

According to another aspect of the present invention, a cellular mobile radio network is provided having at least one base station integrated into a facility supplied via a power supply network and connected to an assigned base station controller, the at least one base station including: a module for exchanging radio frequency signals with mobile radio devices; a first transceiver module configured to couple the at least one base station to the power supply network, wherein a transmission of electrical signals corresponding to the radio frequency signals is made possible bidirectionally between the first transceiver module and a second transceiver module over the power supply network, the second transceiver module being likewise coupled to the power supply network at another place than the first transceiver module, and the second transceiver module being connected to the base station controller assigned to the at least one base station, so that a communication over the power supply network is made possible between the at least one base station and the base station controller assigned thereto; and a control device configured to control the facility, the control device being connected to the facility via the power supply network or directly, the control device including an identification module and means for communicating with a central unit, the control device being identifiable by the central unit based on the identification module.

In particular the control device can include e.g. at least means for switching the facility on and off. The device of this embodiment has the advantage, among others, that a minimum in new installations is required for expanding the network in that one uses the existing infrastructure. This relates not only to the cost investment, but also to the investment in time necessary for the construction of a comparable standard installation of base stations.

Another advantage is that the transmitting power of the base stations can be kept small through the relatively small cell size in the mostly very local installations. This can be correspondingly important with the increasingly strict state limits. A further advantage is that the public facilities can be operated in a time-controlled way, without operation of the base stations being thereby affected.

In an embodiment variant, the transceiver modules use for transmission a transmitting signal, a receiving signal as well as a separate control signal. This embodiment variant has in particular the advantage that it corresponds to GSM requirements.

In another embodiment variant, used as the public facilities for installation of the base stations are street illumination devices of the road network, such as e.g. street lights or other illuminating elements of public and private facilities, etc. This embodiment variant has the advantage, among others, that it makes use of easily accessible and widespread public facilities.

In a further embodiment variant, used as the public facilities for installation of the base stations is the power supply network of public means of transportation with the installation devices belonging thereto. This embodiment variant has the same advantages as the preceding embodiment variant.

In an embodiment variant, the base station controller and the base stations connected thereto each have a control processor with a modem, which control processor is coupled, for example, to a frequency triplexer/triplex filter. The radio frequency signals are transmittable through two transmission signals and a control signal in a separate frequency range via the control processor and the modem. This embodiment variant has the advantage that it corresponds to GSM requirements.

In another embodiment variant, the transceiver modules use Frequency Shift Keying (FSK) as the frequency modulation technique for the transmission. This embodiment variant has the advantage that transmission security is heightened.

In a further embodiment variant, the transceiver modules use FDMA (Frequency Division Multiple Access) and/or TDMA (Time Division Multiple Access) or CDMA (Code Division Multiple Access) as the frequency modulation technique for the transmission. This embodiment variant has the advantage that the combination of TDMA and FDMA corresponds to the GSM standard, and broadband CDMA with a transmission rate of up to 2 Mbit/second corresponds to the UMTS standard.

In a further embodiment variant, OFDM (Orthogonal Frequency Division Multiplexing) is used. This has the advantage that the technical advantages of the TDMA and CDMA concepts are combined. In another embodiment variant, the transceiver modules use a transmission frequency band between 100 MHz and 500 MHz for transmission of the radio frequency signals over the power supply network. This has the advantage, among others, that this frequency band is especially suitable for transmission over the power supply network.

In a further embodiment variant, the at least one of base station covers two or more different receiving/transmitting cells with different cell group identities.

According to another aspect of the present invention, a method is provided for setting up a base station of a cellular mobile radio network and connecting the base station to a mobile radio network, at least one base station being installed in a facility supplied with power via a power supply network and being connected to an assigned base station controller. The method includes: exchanging radio frequency signals between mobile radio devices and the at least one base station, the at least one base station being coupled via a first transceiver module to the power supply network, and a second transceiver module being likewise coupled to the power supply network at another place than the first transceiver module; transmitting electrical signals corresponding to the radio frequency signals bidirectionally between the first and second transceiver modules over the power supply network, the second transceiver module being connected to the base station controller assigned to the at least one base station so that a communication over the power supply network is made possible between the at least one base station and the base station controller assigned thereto; controlling the facility with a control device of the at least one base station, the control device being connected in series to the facility via the power supply network or directly to the facility; and unambiguously identifying the control device by a central unit based on an identification module of the control device, the central unit communicating with the control device over a network.

It should be stated here that, in addition to the method according to the invention, the present invention also relates to a system for carrying out this method.

BRIEF DESCRIPTION OF THE DRAWINGS

Embodiment variants of the present invention will be described in the following with reference to examples. The examples of the embodiments are illustrated by the following attached figures.

DESCRIPTION OF THE PREFERRED EMBODIMENTS

Figure 1:
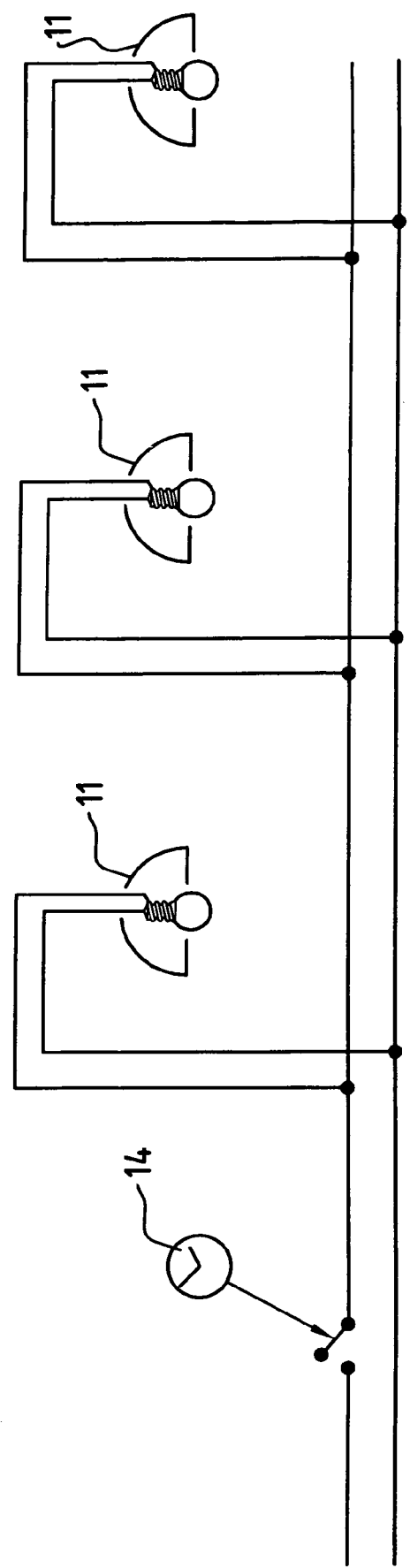
FIG. 1 shows a block diagram illustrating schematically street illumination devices, time controlled by a time control module, of the public road network, whereby street illumination devices, connected in succession, are switched on and off by the time control module.

Referring now to the drawings, wherein like reference numerals designate identical or corresponding parts throughout the several views, and more particularly to FIGS. 3-9 thereof, FIGS. 3-9 show various embodiment examples including a cellular mobile radio network that includes at least one mobile-services switching center MSC, with a transmitting/receiving area assigned to the mobile-services switching center MSC, and one or more base station controllers BSC1/BSC2, each with one or more base stations (BTS: Base Transceiver Station) 10. The structure of the mobile radio network and its components can be carried out e.g. according to the GSM standard (Global System for Mobile Communications) of the ETSI (European Telecommunications Standards Institute) or the UMTS standard (Universal Mobile Telephone System). The mobile radio network can be e.g. a public mobile radio network (PLMN: Public Land Mobile Network).

Figure 6:
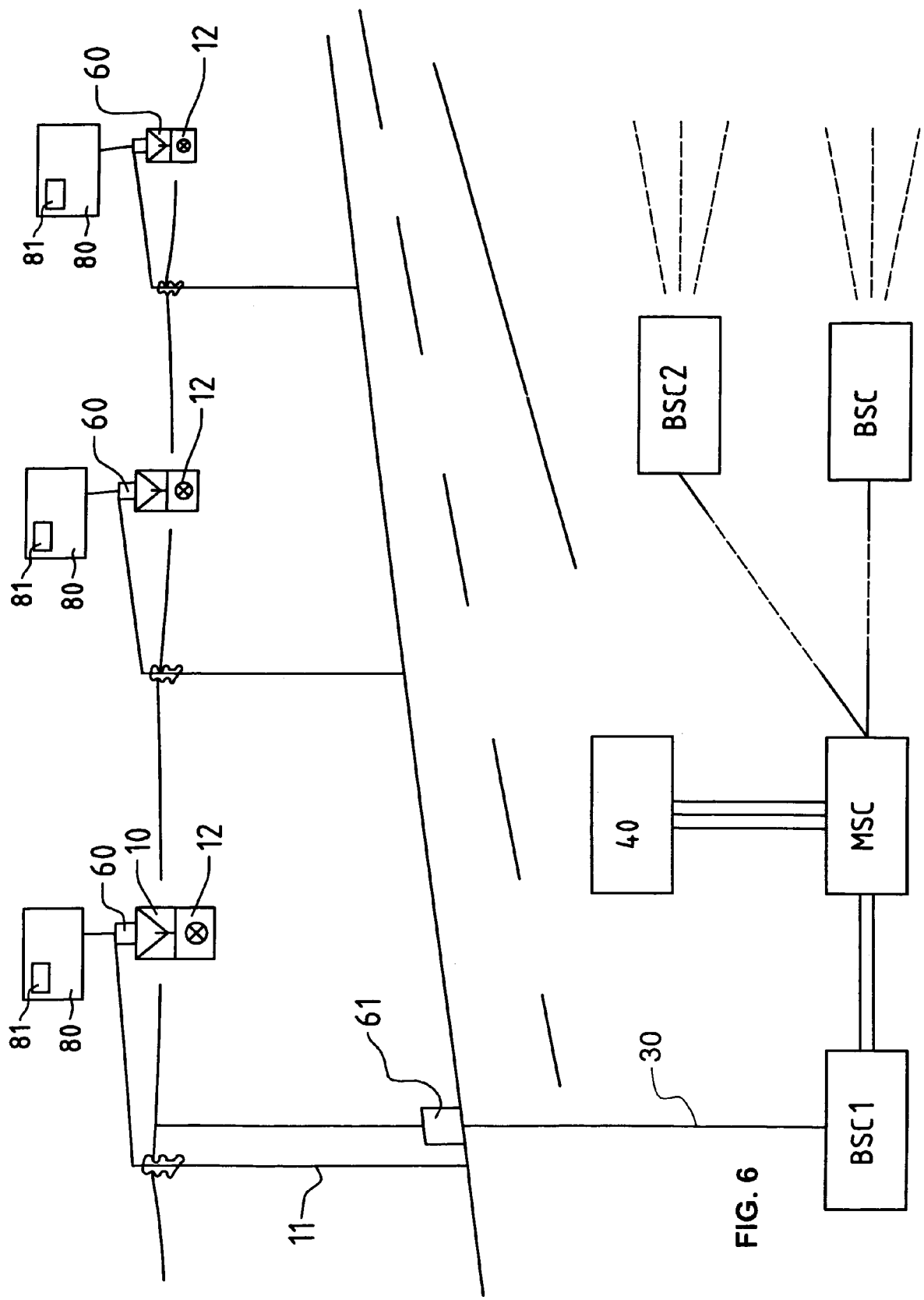
FIG. 6 shows a block diagram illustrating schematically an embodiment example of a mobile radio network, a transceiver module, assigned to a Base Station Controller (BSC), and communicating simultaneously with a multiplicity of transceiver modules of different base stations.

The mobile radio network is connected, for example, via the mobile-services switching center MSC to the public switched telephone network (PSTN: Public Switched Telephone Network) 40 as shown in FIG. 6. The mobile-services switching center MSC includes switching and signalling functions for management of mobile radio devices. The base station controllers BSC1/BSC2 are connected to the mobile-services switching center MSC, and include monitoring and control functions for the base stations 10. One or more of the base stations 10 are connected to a common assigned base station controller BSC (FIG. 6), and each includes a module for exchanging radio frequency signals with mobile radio devices, which mobile radio devices lie within the transmitting/receiving area covered by a corresponding base station 10, a so-called transmitting/receiving cell $C_1 \ldots C_5$.

The base stations 10 are integrated into existing facilities 11 on exposed (uncovered) public facilities, which facilities 11 are supplied for example via a power supply network 20/21 or have a power supply network connection. It is understood by "existing facilities" the facilities which are, or can be, used also for purposes other than for the integration of the base stations 10. It is understood by "public ground" places from which the base stations 10 cover exposed (uncovered) areas $C_1 \ldots C_5$ with radio frequency signals. Thus, it is absolutely possible for the places to be on private territory.

For example, such already existing infrastructure on exposed (uncovered) public territory includes street illumination devices such as street lights, street lamps, flood lights for sports fields, stadiums, etc., installations for power supply of public transportation means, such as e.g. street cars or railways, but also such installations in a broader sense such as ski lift installations, cable car installations, etc.

Shown as facilities 11 in this embodiment example were street illumination devices 12 of the public road network. The reference numeral 13 designates the antenna of a base station 10. As shown in FIG. 6, the base stations 10 are each coupled with a first transceiver module 60 to the power supply network 20. A second transceiver module 61 is likewise coupled to the power supply network 20 at a different place.

Transmission of electrical signals corresponding to the radio frequency signals is thereby made possible bidirectionally between the transceiver modules 60/61 over the power supply network 20 by means of the transceiver modules 60/61. The communication between the transceiver modules 60/61 can be achieved in particular based on IPng (Internet Protocol next generation) or another Internet protocol (IP) of the IEFT (Internet Engineering Task Force) Standards Committee. In particular IPv6 and IPv4 come under this. The transceiver modules 61 are connected to the base station controller BSC1/BSC2 assigned to the respective base station 10, so that communication between the base stations 10 and the base station controller BSC1/BSC2 assigned to them can take place over the power supply network 20 and the connection 30. Power Line Communication PLC, i.e. the transmission over the power supply network of electrical signals corresponding to the radio frequency signals is known in the state of the art in various embodiment variants. Examples of such configurations may be found in the patent document WO98/06188 "Power Line Communications" the contents of which are entirely incorporated by reference herewith or in the patent publication U.S. Pat. No. 5,977,650 "Transmitting Communications Signals Over A Power Line Network," the entire contents of which is also incorporated by reference herewith. The connection 30 between the transceiver modules 61 and the base station controller BSC1/BSC2 can take place e.g. via a coaxial cable, an optical cable/glass fiber cable or via twisted pair cable.

Neighboring transmitting/receiving cells of base stations of conventional mobile radio networks typically have a size ranging between 2 and 20 km. Used thereby are mostly short range (low power) base stations. In the embodiment of the present invention, the cell size of the individual cells $C_1 \ldots C_5$ can be much smaller, however, for instance only 50 m in size. This can be the case in particular with integration of the base stations 10 in the street illumination devices 12, as in this embodiment example. The handover with such microcells $C_1 \ldots C_5$, i.e., the handover of the connection of a mobile radio device of a moving user by the base station 10 of a cell $C_i$ to the base station of the next cell $C_{i+1}$ respectively $C_{i-1}$, must be able to take place very quickly owing to the size of the micro cell $C_1 \ldots C_5$. An example of such a method is described in the patent publication U.S. Pat. No. 5,189,734 "Cellular Radio System," the entire contents of which is incorporated by reference herewith.

The base station 10 includes a control device 80 for control of the facility 11. The control device can be connected to the facility 11 via the power supply network 20/21 and/or directly. The control device can be connected in series to the facility 11 in the power supply network 20/21, e.g. for switching on and off the facility 11. The control device 80 includes an identification module 81 and a module for communicating with a central unit, the control device 80 being identifiable by the central unit based on the identification module 81. The identification module 81 can include e.g. a smart card or SIM card (Subscriber Identity Module).

The identification can use an unambiguous identification number such as a processor number, appliance number, IMSI (International Mobile Subscriber Identity) or MSISDN (Mobile Subscriber ISDN) numbers. The control device 80 can be controlled e.g. by the central unit via the assigned base station controller by way of the transceiver modules. The control device 80 of the base station can furthermore be connected to the central unit via a mobile radio network, for example.

Figure 2:
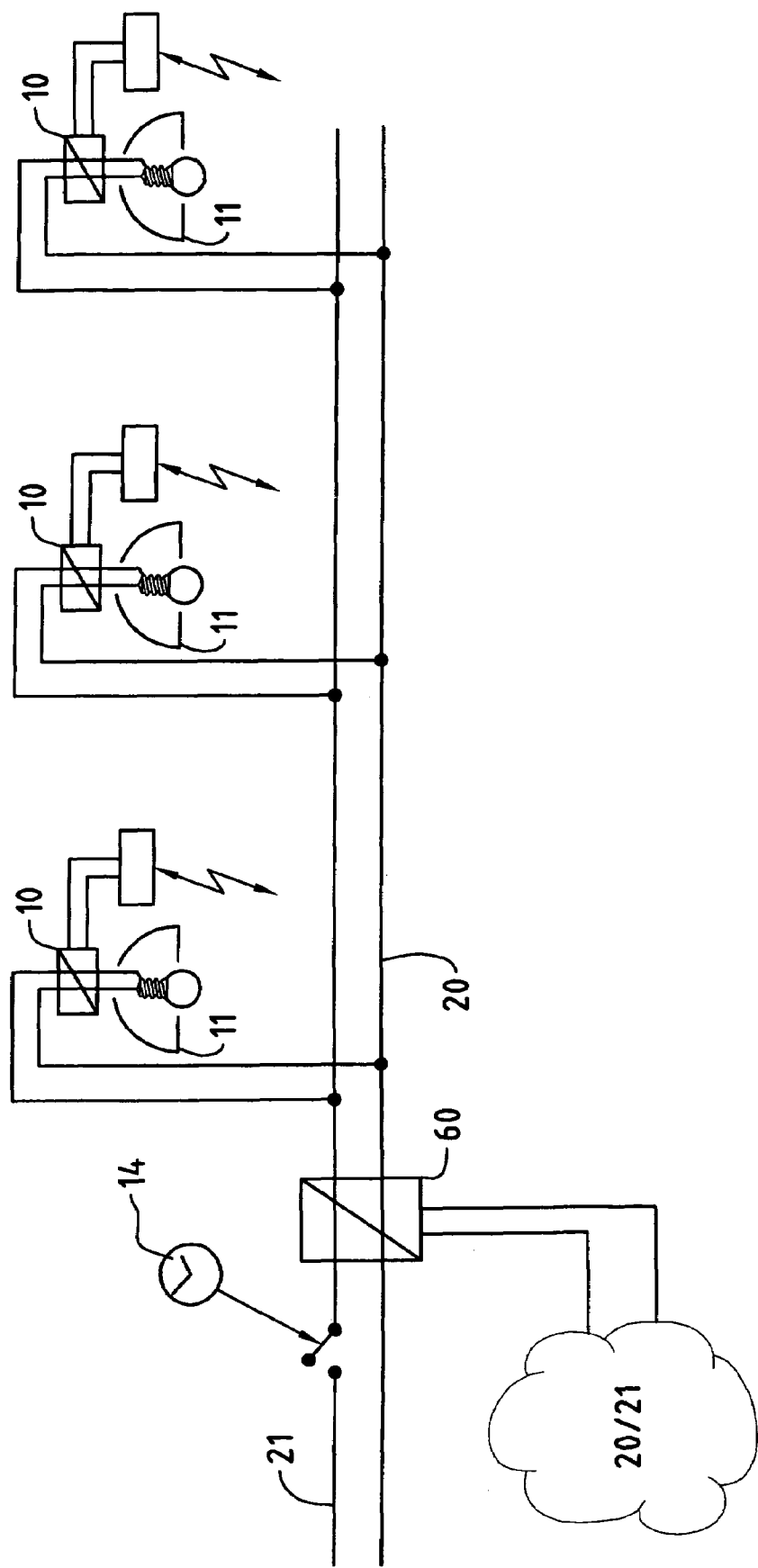
FIG. 2 shows a block diagram illustrating schematically a mobile radio network according to the state of the art, in which the street illumination devices of the public road network are used.

The control device 80 can include e.g. at least a module for switching the facility 11 on and off. FIGS. 1 and 2 show embodiments of the background art without control module 80 connected to each facility, i.e., street illumination devices. The street illumination devices in FIGS. 1 and 2 are controlled or respectively switched on and off via a single, general, time control module 14.

Figure 4:
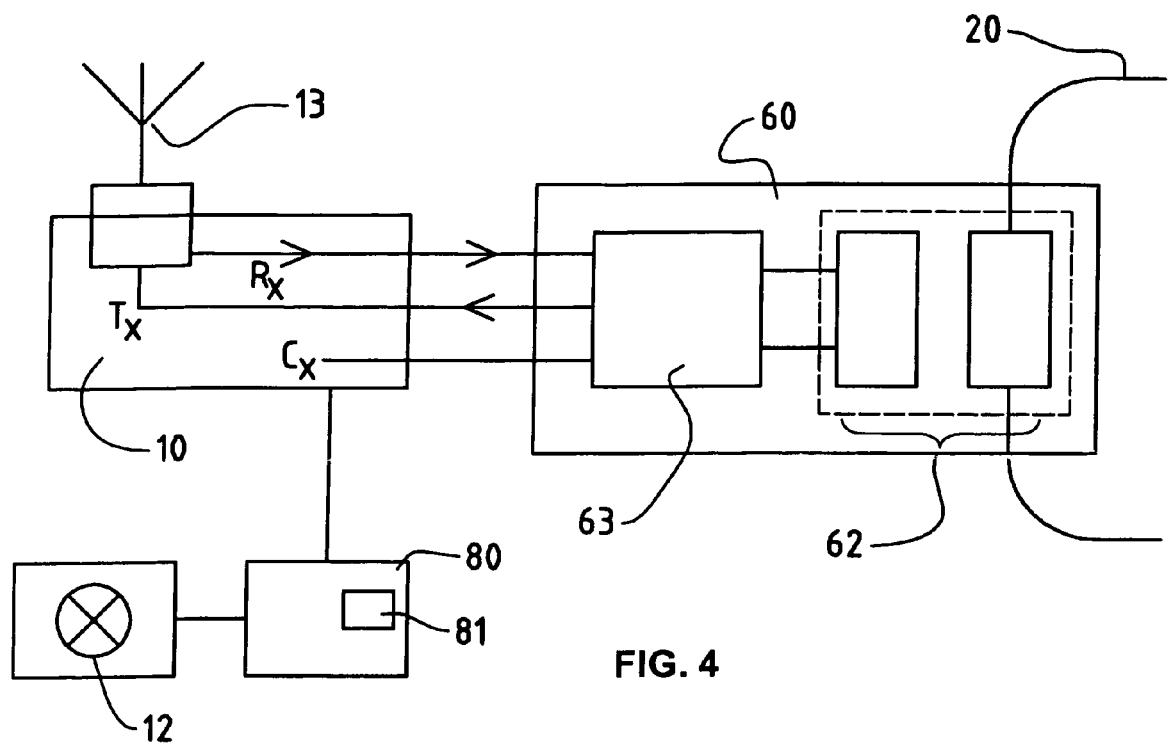
FIG. 4 shows a block diagram illustrating schematically an embodiment example of a base station integrated into a street illumination device as well as a transceiver module for connection to the base station controller.
Figure 5:
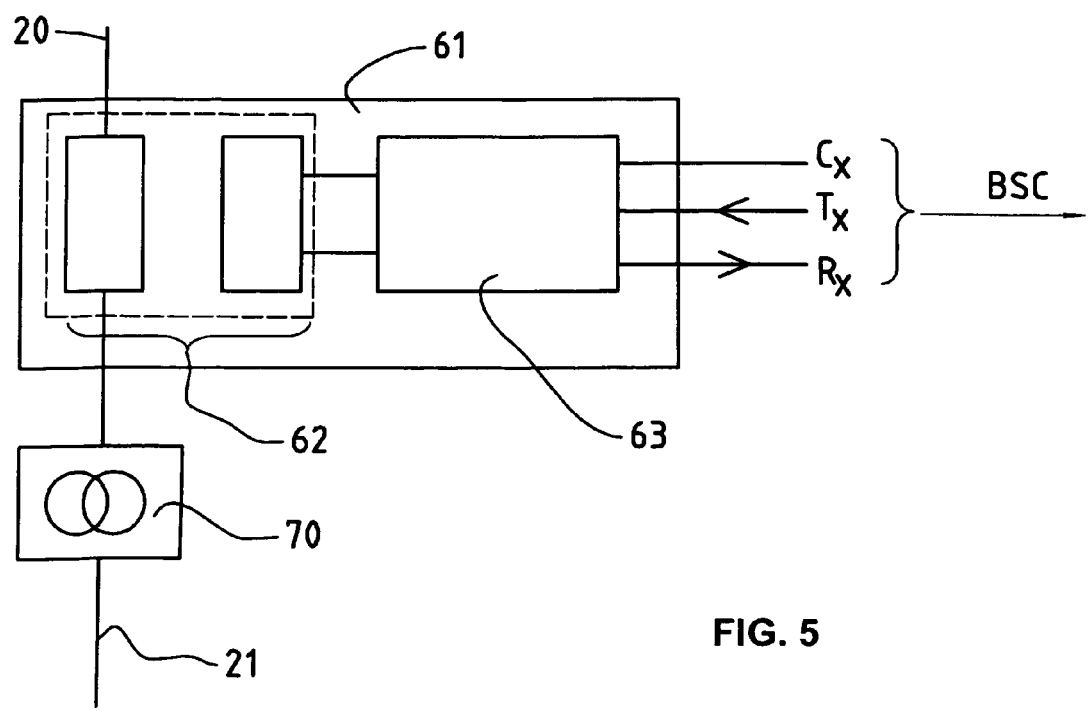
FIG. 5 shows a block diagram illustrating schematically another embodiment example of a base station integrated into a street illumination device as well as the transceiver module for connection to the base station controller.

FIGS. 4 and 5 show the transceiver modules 60/61 in more detail. As in the previous embodiment example, the radio frequency signal is transmitted in each case bidirectionally between the base stations 10 and base station controller BSC via the power supply network 20 by the two transceiver modules 60/61. Connected in series to the transceiver module 61 can be a transformer module 70, which transforms, if necessary, the electrical voltage of the supply line 21 (e.g. 11 kV (kVolt)) to the voltage required by the street illumination devices 12 of e.g. 230 V or respectively 400 V.

The transceiver modules 60/61 are each composed of a coupling element 62, by which the transceiver modules 60/61 are coupled to the power supply network, and of a modem module 63, which modulates or respectively demodulates the radio frequency signals according to the power supply network 20.

The modem module 63 of the base stations 10 encompasses for example the function of converting radio frequency signals of the frequency band bidirectionally, which frequency band is suitable for transmitting and receiving in free space (i.e. between the antenna 13 of the base station and the mobile radio devices located in the assigned transmitting/receiving cell, e.g. 900/1800 MHz), to the frequency band suitable for the transmission of the signals over the power supply network (e.g. between 100 MHz and 500 MHz).

Moreover, the modem module 63, assigned to the base station controller BSC, includes the function of converting the transmission frequency band of the signals on the power supply network 20 bidirectionally into a frequency band suitable for the transmission to the base station controller BSC, e.g. via glass fiber cable or coaxial cable. The transceiver modules 60/61 can use as frequency modulation technique for the transmission e.g. Frequency Shift Keying, Frequency Hoping, FDMA (Frequency Division Multiple Access), TDMA (Time Division Multiple Access: GSM uses a combination of TDMA and FDMA) or CDMA (Code Division Multiple Access, especially for UMTS, which, with broadband CDMA, achieves a transmission rate of up to 2 Mbit/second). But other modulation techniques are also conceivable, however, such as ASK (Amplitude Shift Keying) or PSK (Phase Shift Keying).

The transmission frequency band can range between e.g. 50 MHz and 500 MHz, but can also be under 400 kHz, however. Low frequency signals can normally be transmitted better over the power supply network. It has been shown, however, that radio frequency signals in a frequency range between 100 MHz and 500 MHz in most cases result in a reasonable relationship between transmission distance and noise. The frequency band between 400 kHz and 50 MHz is less suitable for transmission in most cases since it has large spectral noise components, while in the case of transmission frequencies over 500 MHz the radio frequency signal usually weakens too quickly for the power supply network to still make sense as a transmission medium.

The transceiver modules 60/61 can use e.g. three separate signals for transmission, for example a transmitting signal $T_x$, a receiving signal $R_x$ as well as a control signal $C_x$. The control signal $C_x$ includes e.g. set-up and alarm data for, or respectively from, the base station 10. The transceiver modules 60/61 include, for example, a control processor having a modem. The control processor is coupled to a frequency triplexer/triplex filter, whereby the two transmission signals $T_x$ and $R_x$ and the control signal $C_x$ are transmittable in a separate frequency range. As mentioned, in the case of UMTS, a channel can be up to 2 Mbps, which means up to 4 Mbps with the two signals $R_x$ and $T_x$. Thus the frequency band under 400 kHz is usually unsuitable for transmitting the two channels $R_x$ and $T_x$. But the frequency band under 400 kHz can be used, however, for transmission of the control signal $C_x$.

Figure 3:
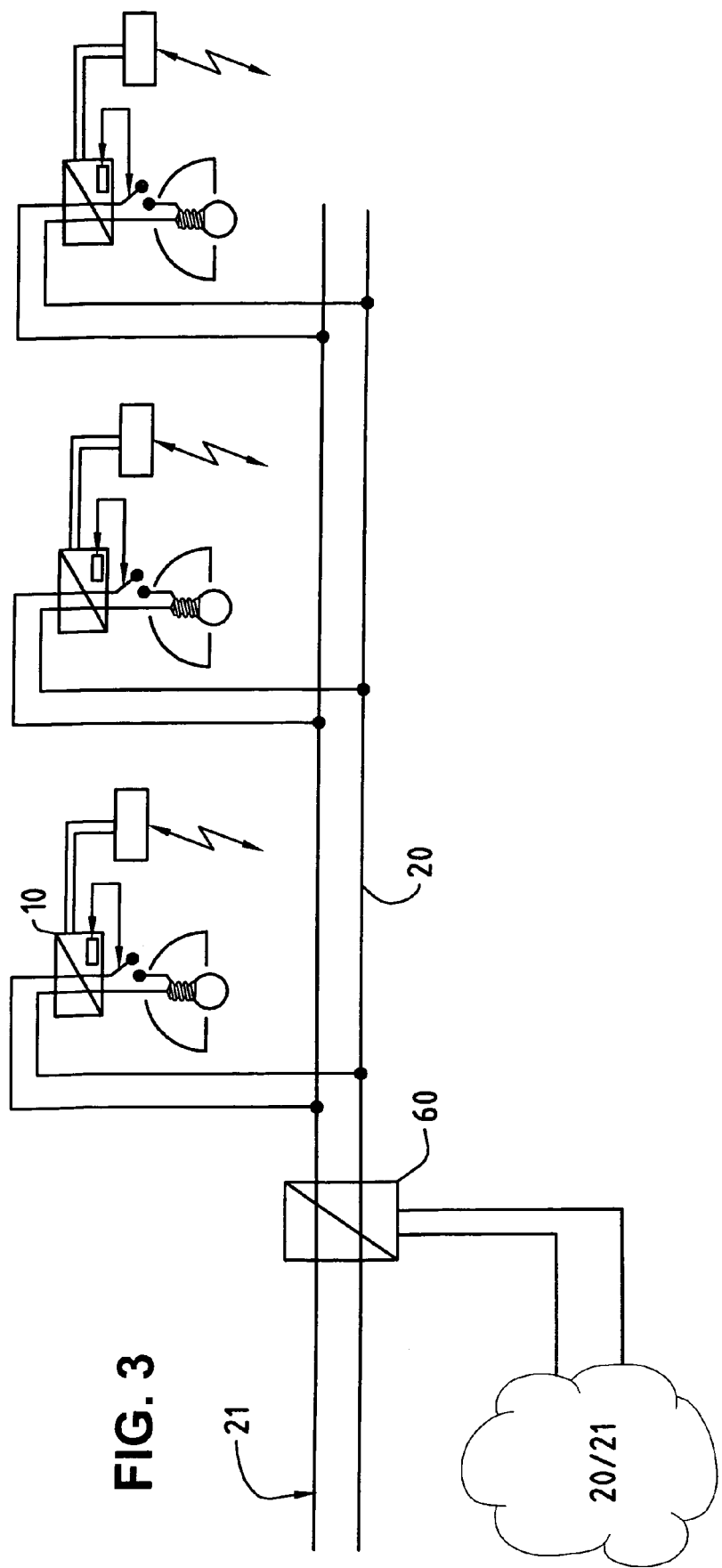
FIG. 3 shows a block diagram illustrating schematically an embodiment example of a mobile radio network according to the present invention, in which the street illumination devices of the public road network are used.

FIG. 6 represents an embodiment example of a mobile radio network similar to the embodiment example of FIG. 3. However, this embodiment has a mobile radio network with a multiplicity of existing facilities 11 connected to the same electrical line with the same voltage. These facilities 11 are not being separated from one another by transformer modules 70. In such an embodiment example, a transceiver module 61 assigned to a base station controller (BSC) can communicate with a multiplicity of transceiver modules 60 from different base stations 10, as is illustrated in FIG. 6.

Figure 7:
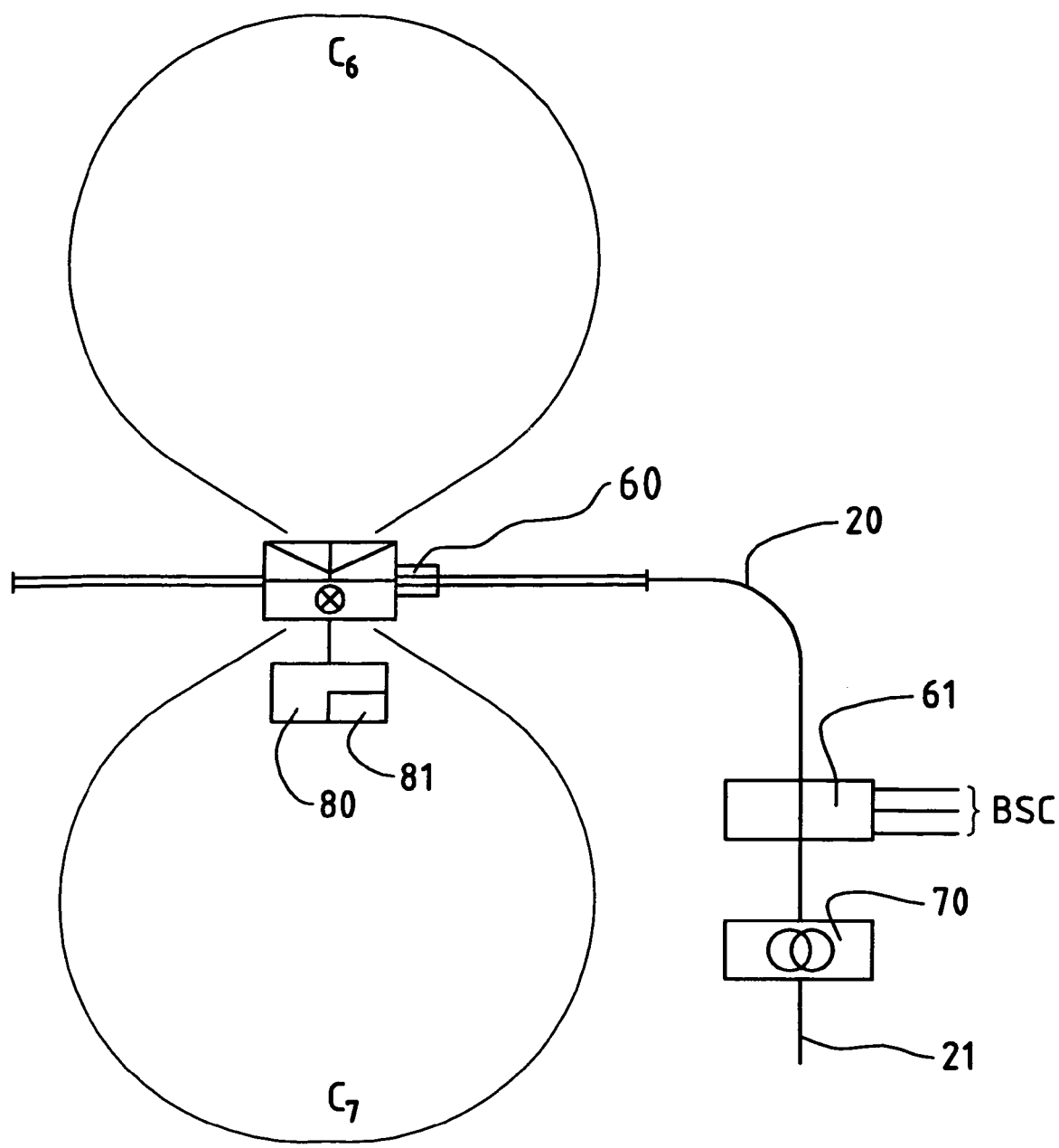
FIG. 7 shows a block diagram illustrating schematically an embodiment example of a base station integrated into a street illumination device, the base station covering two different receiving/transmitting cells with different cell group identities.

FIG. 7 is an embodiment example with a mobile radio network similar to the embodiment example of FIG. 3. In this embodiment example, however, at least one of the base stations 10 integrated into existing facilities 11 covers one or more different receiving/transmitting cells $C_{6...7}$ with different cell group identities. This can be achieved e.g. through exploitation of the directional characteristic of the antennas. The embodiment example of FIG. 7 corresponds to the integration of two or more base stations 10 in accordance with the number of receiving/transmitting cells $C_{6...7}$. Each receiving/transmitting cell $C_{6...7}$ has its owns channel(s), so that a handover takes place if a mobile radio device is moved from the one receiving/transmitting cell to another receiving/transmitting cell.

Figure 8:
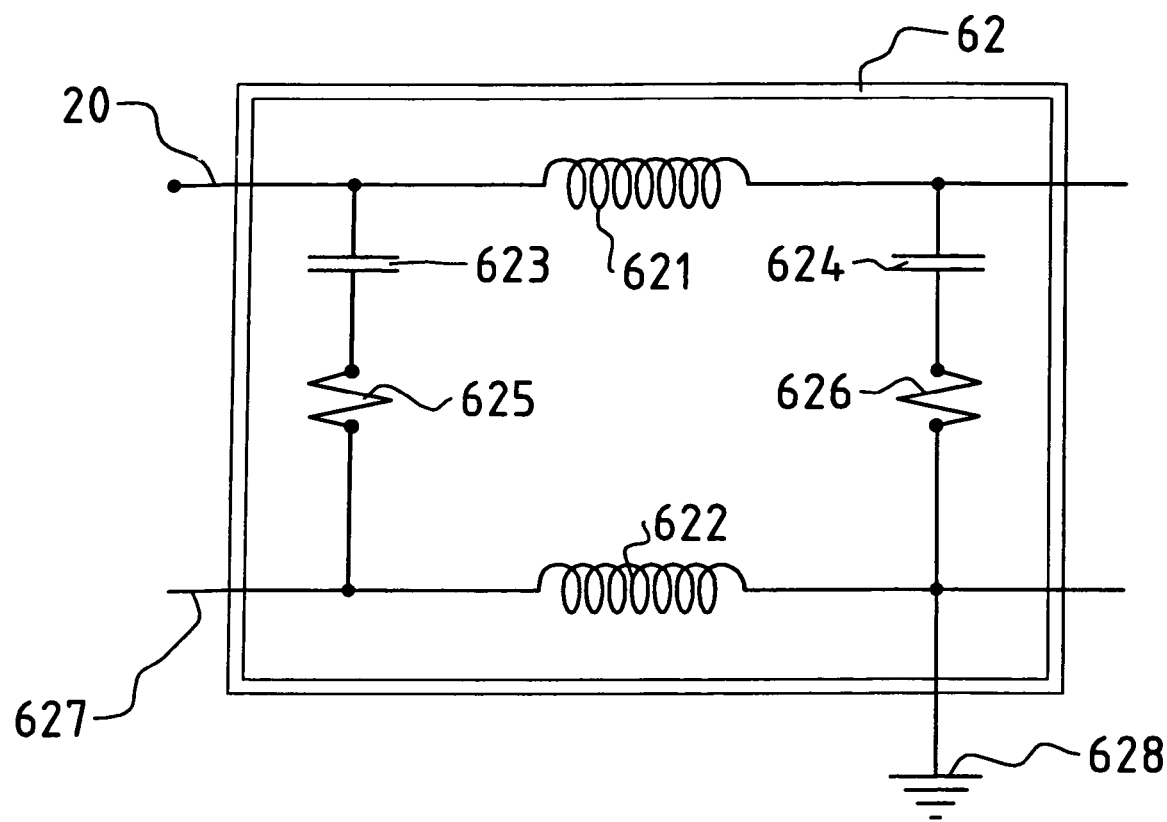
FIG. 8 shows a block diagram illustrating schematically an embodiment example of a coupling element of a transceiver module for bidirectional transmission via the power supply network of electrical signals corresponding to the radio frequency signals.

FIG. 8 illustrates an architecture that can be used to achieve the coupling element 62 in a transceiver module of the embodiment examples of FIGS. 4 and 5. The coupling element 62 is coupled to the power supply network via the connection 20, i.e., an electrical conductor. As in this embodiment example, supply of power to the existing facilities can take place e.g. at 230 V and 50 Hz with max. 100 A. The coupling element 62 includes a primary inductor 621 of e.g. 50 µH to 200 µH depending upon the required signal characteristic. The inductor 621 of the power supply network 20 is coupled to the signal input/output connection 627 via two coupling capacitors 623/624.

The connection 627 connects the coupling element 62 to the modem module, which modulates signals to be transmitted from the base station controller to the base station or vice-versa in the frequency range suitable for the transmission. The two coupling capacitors 623/624 can have e.g. a capacity of 0.01 µF to 0.5 µF. The second coupling capacitor 624 generates together with the first coupling capacitor 623 a further attenuation in that it is connected to earth 628.

The signal input/-output connection 627 includes a secondary inductor 622, e.g. of minimally 250 µH. The two coupling capacitors 623/624 could be additionally supplemented by two fuses 625/626, e.g. safety fuses. If in this case the two coupling capacitors 623/624 failed for whatever reason, the inductor 622 for the main electrical current is connected to earth, and the fuse 626 is destroyed. This can thus serve as additional security.

It is to be mentioned that with the coupling element 62, both inductive coupling (e.g. through a coupling transformer for high frequencies) as well as also capacitive coupling or a combination of the two can be used.

Figure 9:
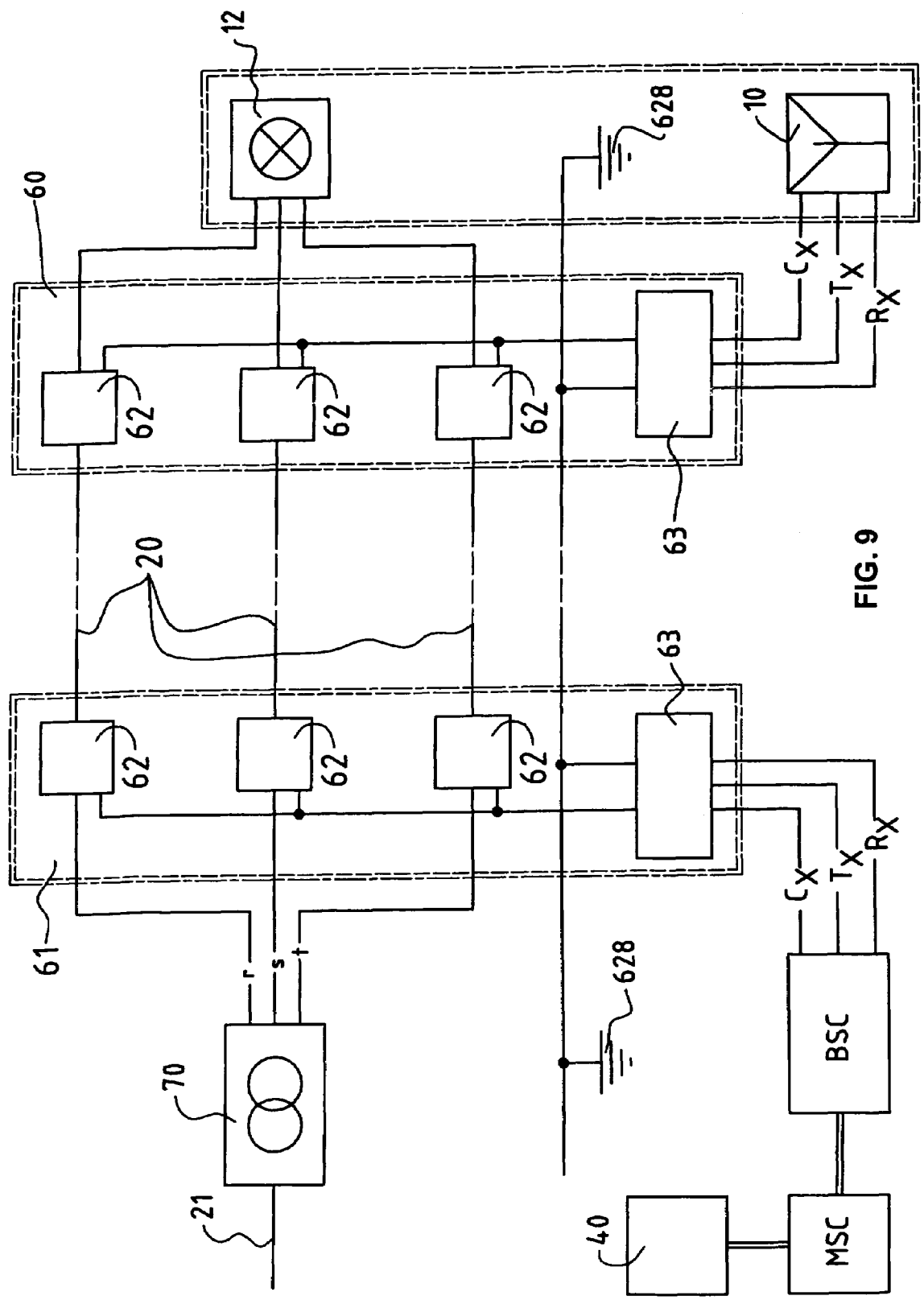
FIG. 9 shows a block diagram illustrating schematically an embodiment example of a mobile radio network with a bidirectional transmission of the radio frequency signals taking place from one transceiver module to another transceiver module and vice-versa over a three-phase power supply network.

FIG. 9 illustrates an architecture which can be used to achieve the transceiver modules 60/61 of a mobile radio network along the lines of the embodiment example of FIG. 3 with a base station integrated into one of the existing facilities. In this embodiment example, a transformer module 70 is connected via the electrical conductor 21 to a multiphase main network with e.g. 11 kV. The transformer module 70 transforms the electrical current to the electrical voltage required by said existing facility (in this embodiment example a street illumination device 12). In this embodiment example, the voltage is transformed to the 400 V of a 3-phase power supply network r/s/t. Each of the phases r/s/t can supply e.g. just one single such facility, or the facilities can be supplied by all three phases r/s/t, if this is necessary, as e.g. with various flood light beams etc.

In this embodiment example, 628 is also the earth. As in the preceding embodiment examples, the mobile-service switching center MSC is likewise connected to the public switched telephone network (PSTN) 40, and the mobile-service switching center MSC, for its part, to the base station controller BSC. The radio frequency signals are transmitted bidirectionally over the power supply network 20 between base station 10 and base station controller BSC by two transceiver modules 60/61. This takes place in that the modem module 63 modulates the signals to be transmitted as in the preceding embodiment example, and transmits them to the coupling elements 62. The input-/output signals $C_x$, $R_x$ and $T_x$ can be transmitted on just one phase, a plurality of phases or on all possible existing phases. Since the phases r/s/t in the power supply network couple capacitively, the input/output signals $C_x/R_x/T_x$ can be taken over at the opposite transceiver module by any of the coupling elements 62 or also taken off separately, even when the signals are transmitted on just one phase. The coupling elements 62 can include a low pass filter, among other things, in order to separate the signals. The street illumination device 12 is likewise connected to the power supply network 20.

It is to be added that the modem module 63 in the embodiment example of FIG. 9 can be a three-way splitter element. The three phases of the power supply network 20 are each coupled via a separate current bar in the transformer module 70 to the power supply network 21. The three coupling elements 62 of the transceiver modules 60/61 can also include more complex high pass filter elements. The coupling elements 62 are also referred to as radio frequency "jumpers," among other things, which usually include an AC blocker and a radio frequency coupling element (capacitive and/or inductive). The coupling elements 62 serve the purpose of letting through only signals in the radio frequency band that is used for transmission of the telecommunications signals and thus preventing the main electrical current of the power supply network 20 from reaching the base station controller BSC or respectively the base station 10.

Between the transceiver modules 60/61 the telecommunications signals are transmitted in both directions, in a direction towards the base station 10 as well as in a direction towards the base station controller BSC. If the radio frequency signals are transmitted from the base station controller BSC to the base station 10, they are emitted via antenna into the receiving/transmitting cell assigned to the base station 10. In reverse direction, radio frequency signals of mobile radio devices are received, via antenna 13, in the receiving/transmitting cell assigned to a base station 10, and are transmitted to the base station controller BSC via the transceiver modules 60/61 and the power supply network 20.

It is to be pointed out that the present invention does not have to be limited to radio frequency signals of mobile radio networks according to the GSM/UMTS specification. With the present invention radio frequency signals can also be transmitted from personal communication systems, broadcast video (DVB), broadcast audio (DAB), paging, two-way or direct satellite broadcasting, wireless networks in particular MAN (wireless Metropolitan Area Network) or WiFi according to the IEEE 811.x specification and/or radio frequency telemetry as well as WLL (Wireless Local Loop) and OFDM systems.

The invention claimed is:

1. A cellular mobile radio network having at least one base station integrated into a facility supplied with power via a power supply network, the at least one base station being connected to an assigned base station controller, the at least one base station comprising:

means for exchanging radio frequency signals with mobile radio devices; a first transceiver module configured to couple the at least one base station to the power supply network, wherein a transmission of electrical signals corresponding to the radio frequency signals is made possible bidirectionally between the first transceiver module and a second transceiver module over the power supply network, the second transceiver module being coupled to the power supply network at another location other than the first transceiver module, and the second transceiver module being connected to the base station controller assigned to the at least one base station so that communication over the power supply network is made possible between the at least one base station and the base station controller assigned thereto; and a control device configured to control the facility into which the at least one base station is integrated, the control device being connected to the facility via the power supply network or directly, the control device including an identification module, means for switching on and off to power the facility, and means for communicating with a central unit, and the control device being identifiable by the central unit based on the identification module, wherein the control device of the at least one base station is controllable by the central unit via the first and second transceiver modules and the assigned base station controller, wherein the facility includes street illumination devices of a road network.

2. The cellular mobile radio network according to claim 1, wherein the control device of the at least one base station is connected to the central unit via a mobile radio network.

3. The cellular mobile radio network according to claim 1, wherein the first and second transceiver modules are configured to transmit a transmitting signal, a receiving signal, and a separate control signal.

4. The cellular mobile radio network according to claim 1, wherein the facility includes power supply networks of a public transport system.

5. The cellular mobile radio network according to claim 1, wherein each of the first and second transceiver modules comprises:

a control processor; and
a modem connected to the control processor,
wherein the control processor is coupled to a frequency triplexer/triplex filter, and the radio frequency signals are transmittable through two transmission signals and a control signal in a separate frequency range between the first and second transceiver modules.

6. The cellular mobile radio network according to claim 1, wherein the first and second transceiver modules use frequency shift keying as the frequency modulation technique for the transmission.

7. The cellular mobile radio network according to claim 1, wherein the first and second transceiver modules use frequency division multiple access and/or time division multiple access or code division multiple access as the frequency modulation technique for the transmission.

8. The cellular mobile radio network according to claim 1, wherein the first and second transceiver modules use a transmission frequency band between 100 MHz and 500 MHz for transmission of the radio frequency signals over the power supply network.

9. The cellular mobile radio network according to claim 1, wherein the at least one base station covers two or more different receiving/transmitting cells with different cell group identities.

10. A method for setting up a base station of a cellular mobile radio network and connecting the base station to a mobile radio network, at least one base station being installed in a facility supplied with power via a power supply network and being connected to an assigned base station controller, the method comprising:

exchanging radio frequency signals between mobile radio devices and the at least one base station, the at least one base station being coupled via a first transceiver module to the power supply network, and a second transceiver module being coupled to the power supply network at another location other than the first transceiver module;
transmitting electrical signals corresponding to the radio frequency signals bidirectionally between the first and second transceiver modules over the power supply network, the second transceiver module being connected to the base station controller assigned to the at least one base station so that communication over the power supply network is made possible between the at least one base station and the base station controller assigned thereto; controlling the facility in which the at least one base station is installed with a control device of the at least one base station, the control device being connected in series to the facility via the power supply network or directly to the facility, wherein the controlling step includes switching on and off to power the facility by the control device; unambiguously identifying the control device by a central unit based on an identification module of the control device, the central unit communicating with the control device over a network; and controlling the control device of the at least one base station with the central unit through the first and second transceiver modules via the assigned base station controller, wherein the facility includes street illumination devices of a road network.

11. The method according to claim 10, further comprising:
connecting the control device of the at least one base station to the central unit via a mobile radio network.

12. The method according to claim 10, further comprising:
transmitting a transmitting signal, a receiving signal as well as a separate control signal with the first and second transceiver modules.

13. The method according to claim 10, wherein the facility includes power supply networks of a public transportation system.

14. The method according to claim 10, further comprising:
transmitting the radio frequency signals in a separate frequency range using two transmission signals and a control signal via a control processor having a modem, both the base station controller and the at least one base station comprising the control processor with the modem.

15. The method according to claim 10, wherein the first and second transceiver modules use frequency shift keying as a frequency modulation technique for the transmission.

16. The method according to claim 10, wherein the first and second transceiver modules use frequency division multiple access and/or time division multiple access or code division multiple access as the frequency modulation technique for the transmission.

17. The method according to claim 10, further comprising: using a transmission frequency band between 100 MHz and 500 MHz for transmission of the radio frequency signals over the power supply network between the first and second transceiver modules.

18. The method according to claim 10, wherein the at least one of the base station covers two different receiving/transmitting cells with different cell group identities.

* * * * *

UNITED STATES PATENT AND TRADEMARK OFFICE
CERTIFICATE OF CORRECTION

| | | |
|---|---|---|
| PATENT NO. | : 7,684,823 B2 | |
| APPLICATION NO. | : 11/290459 | |
| DATED | : March 23, 2010 | |
| INVENTOR(S) | : Eric Lauper | |

It is certified that error appears in the above-identified patent and that said Letters Patent is hereby corrected as shown below:

On the title page, Item (73), the Assignee information is incorrect. Item (73) should read:

-- (73)    Assignee: Swisscom AG, Bern (CH) --

Signed and Sealed this
Twenty-fifth Day of January, 2011

David J. Kappos
*Director of the United States Patent and Trademark Office*